US008824785B2

(12) United States Patent
Ives et al.

(10) Patent No.: US 8,824,785 B2
(45) Date of Patent: Sep. 2, 2014

(54) SEGREGATION OF HANDWRITTEN INFORMATION FROM TYPOGRAPHIC INFORMATION ON A DOCUMENT

(75) Inventors: Paul M. Ives, Toronto (CA); Peter E. Clark, Oakville (CA); Michael V. Gentry, Toronto (CA)

(73) Assignee: DST Technologies, Inc., Kansas City, MO (US)

( * ) Notice: Subject to any disclaimer, the term of this patent is extended or adjusted under 35 U.S.C. 154(b) by 1255 days.

(21) Appl. No.: 12/695,009

(22) Filed: Jan. 27, 2010

(65) Prior Publication Data

US 2011/0182508 A1 Jul. 28, 2011

(51) Int. Cl.
G06K 9/00 (2006.01)

(52) U.S. Cl.
USPC ............................. 382/164; 382/165; 382/175

(58) Field of Classification Search
USPC ......................................... 382/164, 165, 175
See application file for complete search history.

(56) References Cited

U.S. PATENT DOCUMENTS

| | | | |
|---|---|---|---|
| 4,992,649 A | 2/1991 | Mampe et al. | |
| 5,181,255 A | 1/1993 | Bloomberg | |
| 5,191,525 A | 3/1993 | LeBrun et al. | |
| 5,258,855 A | 11/1993 | Lech et al. | |
| 5,369,508 A | 11/1994 | Lech et al. | |
| 5,552,901 A | 9/1996 | Kikuchi et al. | |
| 5,587,809 A | 12/1996 | Le Corre et al. | |
| 5,625,465 A | 4/1997 | Lech et al. | |
| 5,631,984 A * | 5/1997 | Graf et al. | 382/317 |
| 5,768,416 A | 6/1998 | Lech et al. | |
| 6,094,505 A | 7/2000 | Lech et al. | |
| 6,397,261 B1 | 5/2002 | Eldridge et al. | |
| 6,510,992 B2 | 1/2003 | Wells et al. | |
| 6,529,956 B1 | 3/2003 | Smith et al. | |
| 6,563,949 B1 * | 5/2003 | Takebe | 382/190 |
| 6,610,955 B2 | 8/2003 | Lopez | |
| 6,671,395 B1 * | 12/2003 | Ott et al. | 382/137 |
| 6,683,697 B1 | 1/2004 | Lech et al. | |
| 6,697,703 B2 | 2/2004 | Lopez | |
| 6,819,777 B2 | 11/2004 | Baker et al. | |
| 6,909,805 B2 | 6/2005 | Ma et al. | |
| 6,940,617 B2 | 9/2005 | Ma et al. | |

(Continued)

OTHER PUBLICATIONS

Shetty Santhosh and M. Shridhar. "Background Elimination in Bank Checks Using Grayscale Morphology." In Seventh International Workshop on Frontiers in Handwriting Recognition, pp. 83-92, Amsterdam, 2000.*

(Continued)

*Primary Examiner* — Wesley Tucker
(74) *Attorney, Agent, or Firm* — Lempia Summerfield Katz LLC

(57) ABSTRACT

A system for segregating handwritten information from typographic information on a document may include a memory, an interface, and a processor. The memory stores an electronic document image of a document where the electronic document image includes pixels and each pixel has a characteristic. The processor may receive, via the interface, the electronic document image and may identify first, second and third most frequently occurring characteristics of the pixels of the electronic document image. The pixels having the first most frequently occurring characteristic represent a background of the document. The processor may determine the typographic information of the document as represented by pixels having the second most frequently occurring characteristic. The processor may determine the handwritten information of the document as represented by pixels having the third most frequently occurring characteristic. The processor may derive a first representation of the handwritten information and a second representation of the typographic information.

31 Claims, 8 Drawing Sheets

(56) References Cited

U.S. PATENT DOCUMENTS

| | | |
|---|---|---|
| 7,072,514 B1 | 7/2006 | Thouin |
| 7,075,673 B2 | 7/2006 | Lech et al. |
| 7,162,635 B2 | 1/2007 | Bisbee et al. |
| 7,184,162 B2 | 2/2007 | Lech et al. |
| 7,259,887 B2 | 8/2007 | Lech et al. |
| 7,283,270 B2 | 10/2007 | Boire-Lavigne et al. |
| 7,362,908 B2 * | 4/2008 | Mitchell et al. ............... 382/239 |
| 7,474,434 B2 | 1/2009 | Lech et al. |
| 7,570,383 B2 | 8/2009 | Lech et al. |
| 7,619,768 B2 | 11/2009 | Lech et al. |
| 7,672,007 B2 | 3/2010 | Lech et al. |
| 2003/0145212 A1 | 7/2003 | Crumly |
| 2004/0158733 A1 | 8/2004 | Bouchard |
| 2004/0240735 A1 | 12/2004 | Medina |
| 2005/0192924 A1 | 9/2005 | Drucker et al. |
| 2006/0238822 A1 | 10/2006 | Van Hoof |
| 2008/0002224 A1 | 1/2008 | Tanimoto |
| 2008/0019519 A1 | 1/2008 | Su et al. |
| 2008/0133940 A1 | 6/2008 | Laurie et al. |
| 2008/0144121 A1 | 6/2008 | Malatesta |
| 2008/0256061 A1 | 10/2008 | Chang et al. |
| 2010/0067067 A1 | 3/2010 | Lech et al. |

OTHER PUBLICATIONS

X Ye, M Cheriet, CY Suen , "A generic system to extract and clean handwritten data from business forms" Seventh international workshop on on Frontiers in Handwriting Recognition, pp. 63-72, 2000.*

José Eduardo Bastos Dos Santos, Bernard Dubuisson and Flávio Bortolozzi , "Characterizing and Distinguishing Text in Bank Cheque Images" Proceedings of the XV Brazilian Symposium on Computer Graphics and Image Processing (SIBGRAPI'02), 7 pages, 2002 IEEE.*

Nielson, Heath and Barrett, William, "Automatic Zoning of Digitized Documents," available at: http://fht.byu.edu/prev_workshops/workshop01/final/Nielson.pdf, last visited Aug. 25, 2010, 2 pages.

Ye, Xiangyun, Cheriet, Mohamed, and Suen Ching, "A Generic System to Extract and Clean Handwritten Data from Business Forms," Proceedings of the Seventh International Workshop on Frontiers in Handwriting Recognition, Sep. 11-13, 2000, pp. 63-72.

"Hausdorff Distance Image Comparison," available at http://www.cs.cornell.edu/Vision/hausdorff/hausdist.html, copyright 2000, 2 pages [retrieved on Jul. 2, 2009].

Andreev, Andrey and Kirov, Nikolay, "Some Variants of Hausdorff Distance for Word Matching," Institute of Mathematics and Informatics, Bulgarian Academy of Sciences, 2008, pp. 3-8.

Evans, Christopher, "Notes on the OpenSURF Library," Jan. 18, 2009, 25 pages.

"Optical Mark Recognition," Wikipedia, the free encyclopedia, available at: http://en.wikipedia.org/wiki/Optical_mark_recognition, last modified on Oct. 16, 2009, pp. 1-6 [retrieved on Oct. 21, 2009].

Kesavamurthy et al., "Pattern Classification using imaging techniques for Infarct and Hemorrhage Identification in the Human Brain," Calicut Medical Journal 2006; 4(3):e1, 5 pages.

Klein, "A2iA, Recognizing the Worlds's Handwriting", Mar. 26, 2009, pp. 1-13.

Beretta et al., "Perceptually lossy compression of documents", HPL-97-23, Jan. 1997, 13 pgs.

* cited by examiner

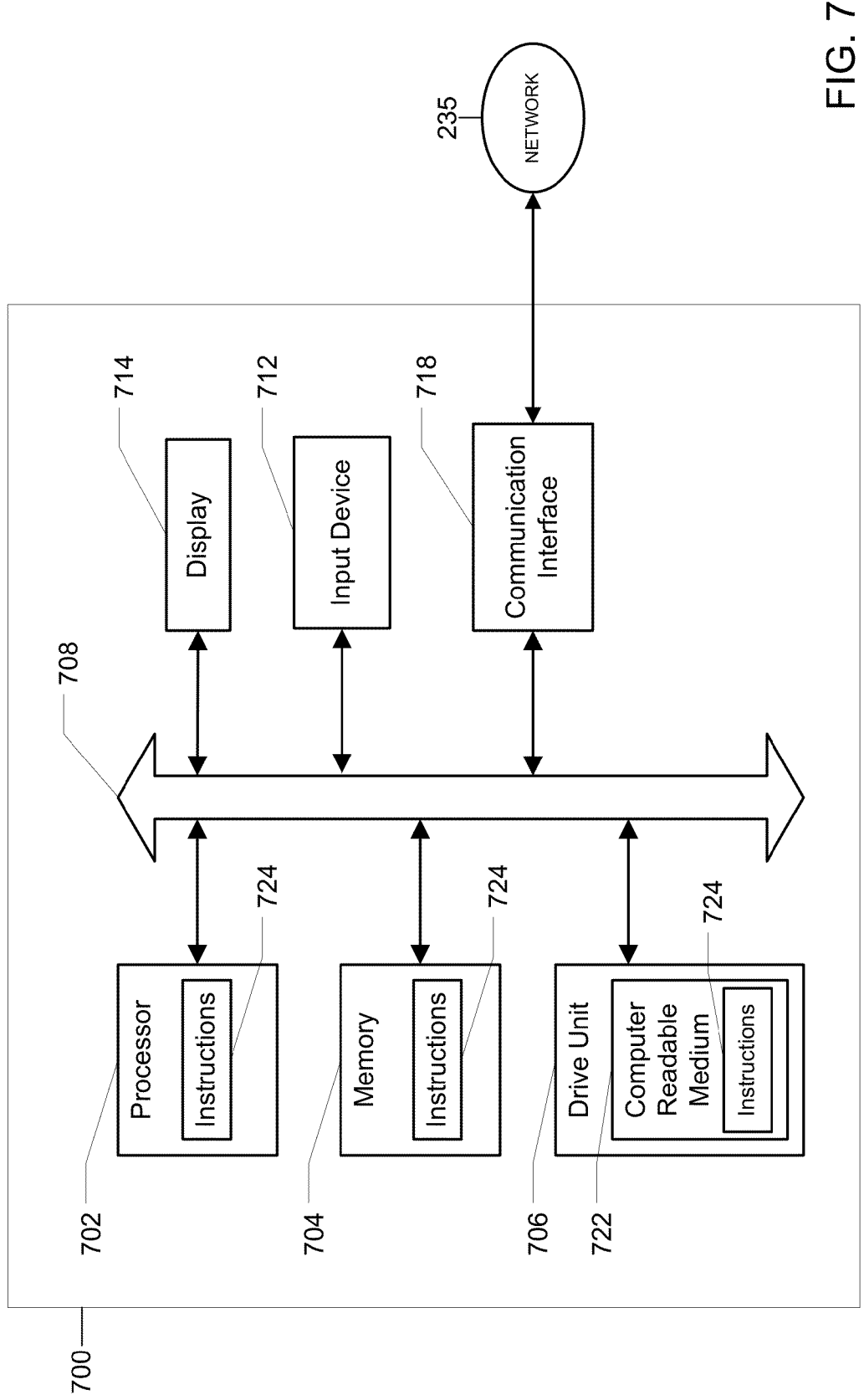

SEGREGATION OF HANDWRITTEN INFORMATION FROM TYPOGRAPHIC INFORMATION ON A DOCUMENT

TECHNICAL FIELD

The present description relates generally to a system and method, generally referred to as a system, for segregating handwritten information from typographic information on a document, and more particularly, but not exclusively, to segregating handwritten information from typographic information on a document represented by an electronic document image in order to recognize the handwritten information and the context thereof.

BACKGROUND

Although many transactions formerly performed using physical documents are now performed online or otherwise electronically, there still remain many transactions which are mainly performed using physical documents, particularly in the banking, healthcare and financial industries. For example, any transaction requiring an actual signature of a person may typically be performed via the exchange of physical documents bearing the requisite signature. These transactions may be performed using forms containing pre-printed typographic elements, e.g. fields, upon which a person may provide handwritten information, make one or more handwritten selections and/or provide a handwritten signature. The forms may then be physically sent to a receiving organization which handles and collates the forms. The receiving organization may be provided or contracted by one or more banks, healthcare service firms, financial service firms, or generally any organization which receives physical forms. Upon receiving the forms, the organization may review each form to determine that the form was filled out correctly and contains any required handwritten information. The organization may input the handwritten information into a database having fields corresponding to the fields of the form or otherwise record that the form was validated. Since the number of forms received by the receiving organization can number well into the hundreds of thousands, the receiving organization may desire an efficient mechanism for verifying the handwritten data on the forms and/or inputting the handwritten data into the corresponding database fields.

SUMMARY

A system for separating handwritten information from typographic information may include a memory, an interface, and a processor. The memory may be operative to store an electronic document image of the document where the electronic document image includes pixels. Each pixel may have a characteristic of a plurality of characteristics. The interface may be coupled with the memory and may be operative to receive the electronic document image. The processor may be coupled with the interface and the memory and may be operative to receive, via the interface, the electronic document image of the document. The processor may identify a first, second and third most frequently occurring characteristic of the pixels of the electronic document image. The pixels which have the first most frequently occurring characteristic may be determined to represent a background of the document. The processor may determine the typographic information of the document as represented by the pixels of the electronic document image which have the second most frequently occurring characteristic. The processor may determine the handwritten information of the document as represented by pixels of the electronic document image which have the third most frequently occurring characteristic. The processor may derive a first representation of the handwritten information and a second representation of the typographic information.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2A is an illustration of an electronic document image of a document containing handwritten information and typographic information.

FIG. 2B is an illustration of typographic information segregated from an electronic document image of a document containing typographic information and handwritten information.

FIG. 2C is an illustration of handwritten information segregated from an electronic document image of a document containing typographic information and handwritten information.

FIG. 7 is an illustration of a general computer system that may be used in the systems of FIG. 2, or other systems for segregating handwritten information from typographic information on a document.

DETAILED DESCRIPTION

Figure 1:
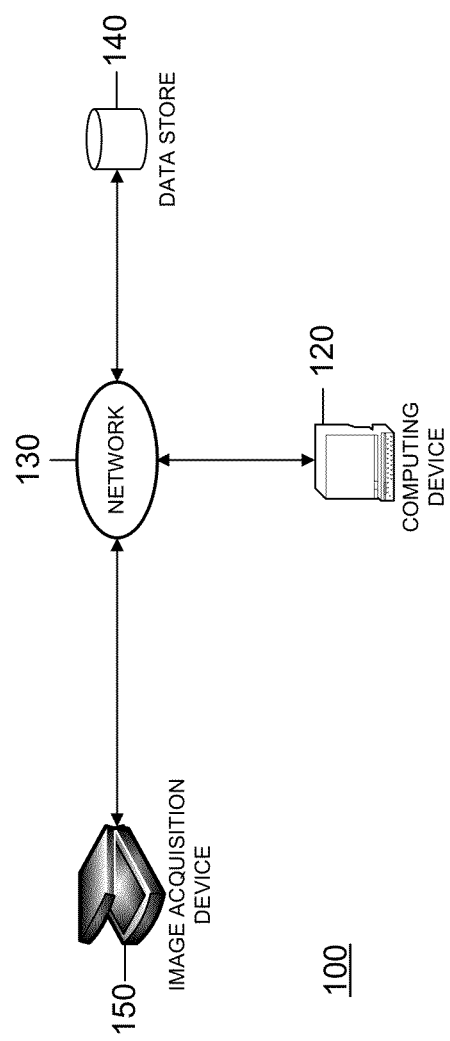
FIG. 1 is a block diagram of a general overview of a system for separating handwritten information from typographic information on a document.

The disclosed embodiments relate to a system for segregating handwritten information from typographic information appearing on a document, and more particularly, but not exclusively, to segregating handwritten information from typographic information appearing on a document represented by an electronic document image, such as a scan, facsimile or photograph of the document, in order to recognize the handwritten information and the context thereof. For illustrative purposes the principles described herein may be referenced in the specific embodiment of typographic information and handwritten information on a document; however the principles may be embodied in many different forms.

The system may be used to segregate handwritten information from typographic information on a document. The system may receive an electronic document image of a document containing handwritten information and typographic information, such as by scanning the document with an optical scanner, digital camera or the like to convert the document to an electronic form comprised of discrete elements, i.e. pixels. The electronic document image may include a number of pixels representing the handwritten information, the typographic information and/or the background of the document. In one example, the handwritten information on the document may be information added to the document by a user, while the typographic information may be any information existing on the document prior to the user's additions. Thus, in this example the handwritten information may be represented by any pixels which are not associated with the typographic information or the background. Each pixel may have one or more characteristics, or attributes, which may describe the pixel and/or may describe information on the document represented by the pixel. For example, a characteristic of the pixel may be a color of the pixel, a position of the pixel, an orientation of the pixel, a characteristic of, or relationship to, a neighboring pixel, or any combination thereof. Alternatively, a characteristic of information represented by the pixel may be the type of ink used to apply the information to the document. Since the characteristics of the information represented by a pixel may not be identifiable by the pixel alone, the characteristics of the information represented by a pixel may be described in metadata associated with the pixel. The system may evaluate each characteristic of each pixel to determine a first, second and third most frequently occurring characteristic or combination of characteristics of the pixels. The pixels having the first most frequently occurring characteristic or combination of characteristics may represent the background, or the document itself. The pixels having the second most frequently occurring characteristic or combination of characteristics may represent the typographic information on the document. The pixels having the third most frequently occurring characteristic or combination of characteristics may represent the handwritten information on the document. Alternatively or in addition, the system may be configured such that pixels having a substantially black color, or within a range of black colors, are identified as representing typographic information, pixels having a substantially white color, or within a range of white colors, are identified as representing the background, while pixels having any other color are identified as representing handwritten information. The system may derive and provide representations of the handwritten information and the typographic information segregated from one another for further processing. For example, the segregated typographic information may be used to identify a document type or source associated with the typographic information, while the segregated handwritten information may be used to identify one or more characters or symbols represented by the handwritten information, such as by performing optical character recognition (OCR) or intelligent word recognition (IWR).

The system may use the document type corresponding to the typographic information along with the location of the handwritten information on the document, relative to the typographic information, to determine a context of the handwritten information. For example, the system may identify a template associated with the document type corresponding to the typographic information. The template may identify one or more regions of the typographic information where handwritten information may be expected, such as a signature line/box, form field or a checkbox, along with the context of the expected handwritten information. The system may use the regions identified in the template along with the location of the handwritten information relative to the typographic information on the document in order to determine the context of the handwritten information. The identified context may be used to determine one or more data fields in a data store where the handwritten information should be stored. The system may store the characters or symbols corresponding to the handwritten information in the determined data fields of the data store. Alternatively or in addition, the context of the handwritten information may be used to assist in performing OCR and/or IWR on the handwritten information. For example if a region where handwritten information is located is associated with numeric information, the OCR and/or IWR may be biased towards numerals over letters when performing the recognition. Alternatively or in addition, the system may store an indication of whether expected handwritten information, such as a signature or a checkmark in a checkbox is present. If a form has multiple checkboxes, the system may use the template to determine an identifier of the checkbox a checkmark is located in.

The system may also use the regions identified in the template to validate that the document contains any required handwritten information and/or is properly completed. For example, each region of the template may include metadata describing whether handwritten information is required in the region or a set of checkboxes may be characterized by metadata indicating that only one of the set may be checked. The system may determine the location of the handwritten information on the document relative to the typographic information. Using the template and the location of the handwritten information relative to the typographic information on the document, the system may determine whether handwritten information exists in all the regions of the template requiring handwritten information. If handwritten information is missing from any of the required regions, the system may classify the document as incomplete, or may otherwise indicate that the document is missing handwritten information.

If the system is unable to identify the document type corresponding to the typographic information based on the typographic information alone, the system may also use the handwritten information to identify the document type of the typographic information. The system may determine the locations of the handwritten information on the document relative to the typographic information. The system may compare the locations of the handwritten information on the document with the locations of regions associated with handwritten information on templates corresponding to any known document types. Alternatively, the system may be able to narrow the possible document types corresponding to the typographic information based on the typographic information. For example, the system may determine that the typographic information may correspond to one of three document types. The system may then compare the locations of the handwritten information on the document relative to the typographic information against the templates associated with the three determined document types to identify the document type of the typographic information.

Alternatively or in addition, the document type associated with the typographic information may be automatically determined by the system, may be manually determined, such as by an operator, or may be provided by an external system, such as a document identifying system. The determined document type may be associated with metadata which indicates characteristics of the pixels associated with handwritten information, characteristics of the pixels associated with typographic information, characteristics of pixels associated with background information, and characteristics of pixels associated with any other information expected to be within the electronic document image, such as a signature stamp. If electronic document images of a given document type include large regions for handwritten information, the metadata associated with the document type may indicate that the first or second most frequently occurring characteristic or combination of characteristics of the pixels are associated with handwritten information and the second or third most frequently occurring characteristic or combination of characteristics of the pixels are associated with typographic information. Alternatively, electronic document images of a given document type include a large amount of typographic information, and only a small amount of handwritten information and background, then the metadata associated with the document type may indicate that the first most frequently occurring characteristic or combination of characteristics of the pixels is associated with the typographic information and the third most frequently occurring characteristic or combination of characteristics of the pixels is associated with the handwritten information. Alternatively or in addition, if electronic document images of a given document type only contain handwritten information and no typographic information, then the metadata associated with the document type may indicate that there are no pixels associated with typographic information, while the first most frequently occurring characteristic or combination of characteristics of the pixels is associated with the background and the second most frequently occurring characteristic or combination of characteristics is associated with the handwritten information. Conversely, if electronic document images of a document type contain no handwritten information, the metadata associated with the document type may indicate that there are no pixels associated with handwritten information, while the first most frequently occurring characteristic or combination of characteristics is associated with the background and the second most frequently occurring characteristic or combination of characteristics is associated with the typographic information.

The system may sort, order, collate, or index the electronic document images, and/or the associated physical documents, based on one or more properties of the electronic document images. The system may provide the sorted electronic document images to an operator, such as through an operator interface. For example, the system may sort the electronic document images such that electronic document images containing handwritten information are displayed to the operator before the electronic document images without handwritten information. The system may collate one or more electronic document images may be collated as being related to one another, such as a multiple pages of a single document, or multiple related documents. The collated electronic document images may be sorted, such that for each group of collated electronic document images, the electronic document images containing handwritten information are displayed to the operator before the electronic document images without handwritten information. By displaying the electronic document images containing handwritten information first, the system may facilitate the operator with focusing on the pages containing handwritten information. Alternatively or in addition, by displaying the electronic document images containing handwritten information first, the system may minimize the chance of the operator overlooking an electronic document image containing handwritten information.

FIG. 1 provides a general overview of a system 100 for segregating handwritten information from typographic information on a document. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a computing device 120, a network 130, a data store 140, and an image acquisition device 150. The computing device 120 may display or otherwise provide an operator interface for use by an operator. The image acquisition device 150 may be used to create one or more electronic document images from one or more mediums, such as paper documents, containing handwritten information and typographic information, or otherwise receive electronic document images from another source. Because the paper documents contain a mixture of machine printed data, i.e. typographic data, and user printed data, i.e. handwritten data, traditional optical character recognition techniques may not work effectively on the documents. The typographic information may be information printed, or applied, to the medium by a machine, such as a printer. The typographic information may be identified by one or more characteristics, such as typeface, color, point size, line length, leading space, tracking space and kerning space. The typographic information may indicate where handwritten information should be applied to the medium, such as by denoting lines, boxes or other indicators as visual cues to a user as to where handwritten information should be written. The handwritten information may be applied to the medium using a writing implement, or writing instrument, such as a pen, pencil, stylus, marker, crayon, etc. The writing implement may be a handheld device for applying information on a medium which can create a smooth, controllable line.

The image acquisition device 150 may be a device capable of converting the medium, such as a document, into an electronic document image or otherwise receiving electronic document images from another source, such as from a storage device or via a wired or wireless network. For example, the image acquisition device 150 may be a scanning or camera device. The image acquisition device 150 may be in communication with the computing device 120 and the data store 140 through the network 130. Alternatively or in addition, the image acquisition device 150 may be in direct communication with one or more of the computing device 120 or the data store 140, such as through a universal serial bus (USB) connection, a serial connection, or generally any wired or wireless data connection. Alternatively or in addition, the image acquisition device 150 may be combined with one or more of the computing device 120 or the data store 140. For example, the image acquisition device 150 may be a handheld device with a camera or scanning device which can capture an image of a document, such as an iPhone™ available from Apple, Inc, smartphones containing a camera or scanning device, a tablet device with a camera or scanning device, or generally any handheld device capable of generating an electronic document image from a physical document. A processor of the handheld device may segregate handwritten information from typographic information in the image and display the result to an operator of the handheld device, such as via a display of the handheld device.

The operator may be a person responsible for monitoring the progress of the system 100, such as via an operator interface (not shown). The operator may use the operator interface to review the electronic document images generated by the image acquisition device 150. If the system 100 is unable to determine the document type represented by the typographic information and/or the characters represented by the handwritten information, the operator may manually determine a document type represented by the typographic information, and/or may manually determine the characters represented by the handwritten information. The system 100 may store the characters represented by the handwritten information into data fields of the data store 140 based on the document type represented by the typographic information and the location of the handwritten information relative to the typographic information. For example, the system 100 may store characters represented by handwritten information located on the medium near a name field of the typographic information into a name data field of the data store 140. The operator interface may be a graphical user interface, such as the user interfaces shown in FIGS. 6A-B below to monitor the progress of the system 100, and manually determine the document type represented by the typographic information and/or the characters represented by the handwritten information, if necessary.

The data store 140 may be operative to store data or information, such as data relating to the electronic document images, the typographic information, the handwritten information, the document type of a document represented by an electronic document image as indicated by the typographic information, the characters represented by the handwritten information, or generally any data related to the system 100. The data store 140 may include one or more relational databases or other data stores that may be managed using various known database management techniques, such as, for example, SQL and object-based techniques. Alternatively or in addition the data store 140 may be implemented using one or more of the magnetic, optical, solid state or tape drives, or other storage medium available now or later developed. The data store 140 may be in communication with the computing device 120 through the network 130. For example, the data store 140 may be a database server running database software, such as MICROSOFT SQL SERVER®, ORACLE®, IBM DB2® or any other database software, relational or otherwise. Alternatively or in addition, the data store 140 may be in communication with other computing devices, such as servers, through the network 130.

The network 130 may include wide area networks (WAN), such as the internet, local area networks (LAN), campus area networks, metropolitan area networks, or any other networks that may allow for data communication. The network 130 may include the Internet and/or the network 130 may be divided into sub-networks. The sub-networks may allow access to all of the other components connected to the network 130 in the system 100, or the sub-networks may restrict access between the components connected to the network 130. The network 130 may be regarded as a public or private network connection and may include, for example, a virtual private network or an encryption or other security mechanism employed over the public Internet, or the like.

The computing device 120 may be connected to the network 130 in any configuration that supports data transfer. This may include a data connection to the network 130 that may be wired or wireless. The computing device 120 may run a web application on any platform that supports web content, such as a web browser or a computer, a mobile phone, personal digital assistant (PDA), pager, network-enabled television, digital video recorder, such as TIVO®, video game console/device, automobile and/or any appliance or device capable of data communications.

The computing device 120 may be a machine that has a processor, memory, a display, a user interface and a communication interface, such as the computing device described in FIG. 7 below. The processor may be operatively coupled with the memory, display and the interfaces and may perform tasks at the request of the standalone application or the underlying operating system. Herein, the phrase "coupled with" is defined to mean directly connected to or indirectly connected through one or more intermediate components. Such intermediate components may include both hardware and software based components. The memory may be capable of storing data. The display may be operatively coupled with the memory and the processor and may be capable of displaying information to the operator. The user interface may be operatively coupled with the memory, the processor, and the display and may be capable of interacting with an operator. The communication interface may be operatively coupled with the memory, and the processor, and may be capable of communicating through the network 130 with the image acquisition device 150. The standalone application may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an internet connection, an infra-red connection, a Bluetooth connection, or any other connection capable of transmitting data. For example, the mobile application may be an application running on an iPhone™ available from Apple, Inc.

Figures 2A, 2B, 2C:
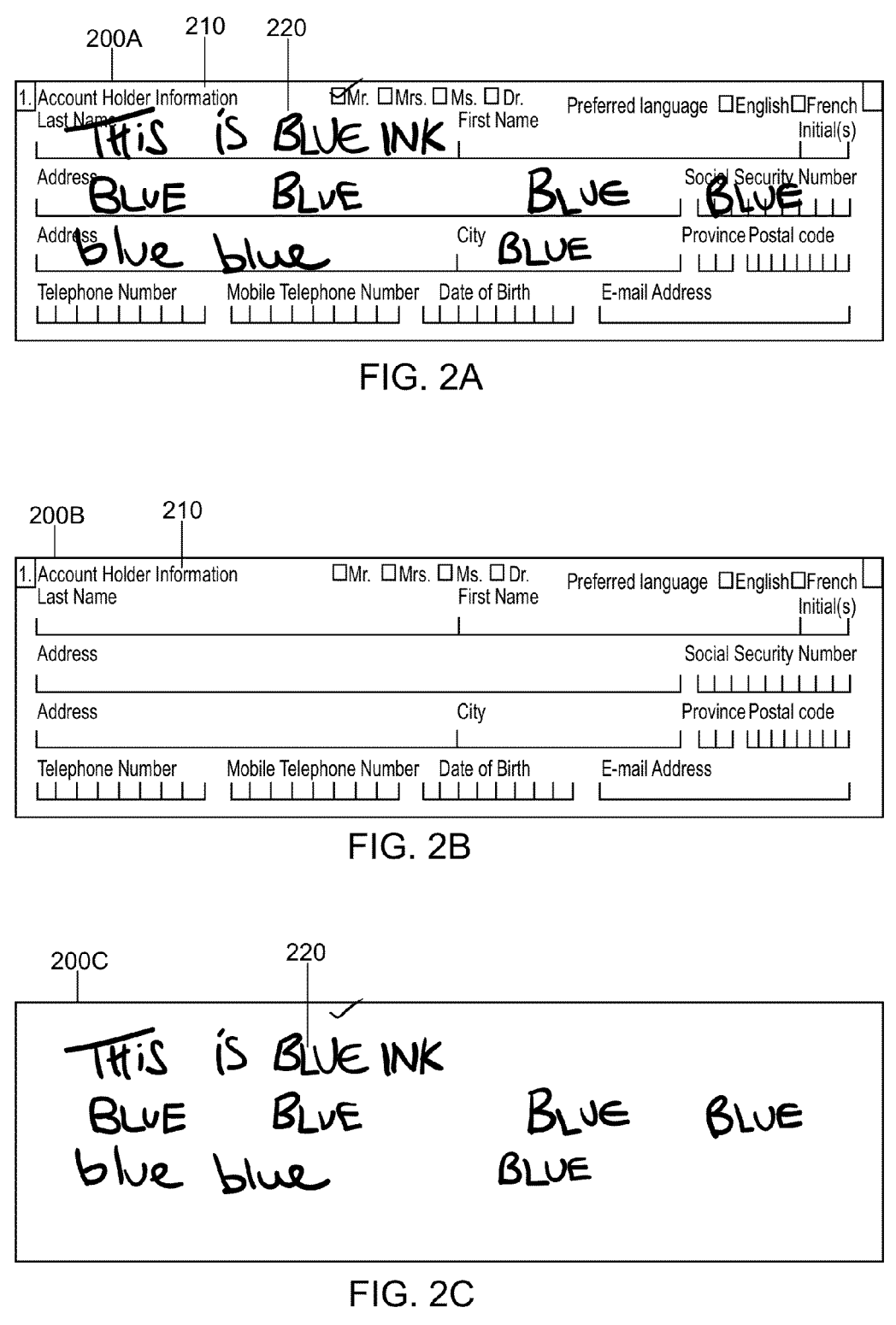

FIG. 2A is an illustration of an electronic document image 200A of a document containing handwritten information and typographic information. The electronic document image 200A of a medium, such as a document, may include handwritten information 220, and typographic information 210. The handwritten information 220 may be information handwritten onto the medium, such as information applied by a user performing and/or authorizing a transaction described or as instructed by the typographic information 210.

The typographic information 210 may represent information generally applied to the medium by a machine, such as data applied by an inkjet printer, a laser printer, a typewriter, or generally by any device capable of applying, impressing or printing typographic information to the medium. Alternatively or in addition, the typographic information may be applied by a compositor or typesetter by hand, such as by using movable type. Alternatively or in addition, the typographic information of an electronic document image of a given document type may be the information on the electronic document image which is static, or constant, across all documents of the same document type. Conversely, the handwritten information may be the information which is unique to a particular electronic document image of a given document type, or information which is not static, or constant, across all documents of a given document type.

The handwritten information 220 may be applied to the medium by a user using a writing implement, such as a pen, a marker, a pencil, or generally any writing implement capable of applying handwritten information to the medium. The writing implement may be a handheld instrument which can be used to create a smooth controllable line. Alternatively, the handwritten information may be applied by a device which mimics information handwritten by a writing implement. For example, the handwritten information may be applied by a pen plotter or a stamp, such as a signature stamp. For example, a document may include a stamp which includes an area for a signature and guarantees the identity of a person signing the stamp, such as a Security Transfer Agents Medallion Program (STAMP) stamp, a Stock Exchanges Medallion Program (SEMP) stamp, a Medallion Signature Program (MSP) stamp, or generally any stamp or imprint which guarantees the signature of the person signing the stamp. A STAMP, SEMP, or MSP imprint may utilize STAMP2000 technology, available from Kemark Financial Services, Inc., to deter counterfeiting. The principal security feature of the STAMP2000 technology may be its security ink. There may be two primary components comprising the security ink, a visible green pigment, and an invisible security compound that is only detectable using a STAMP2000 Transfer Agent Document Reader. A STAMP2000 imprint may also include a bar code.

Alternatively, the handwritten information may be applied by a machine For example, a machine may apply a digital image of handwritten information to a medium, or a digital rendition of handwritten information. In one example, the handwritten information may include any information which was not on the document at the time the document was delivered to the user. Thus, any information added to the document by the user may be identified as handwritten information.

The handwritten information and/or the typographic information may be applied to the medium using one or more types of materials, or inks, such as colored ink, grayscale ink, magnetic ink, ink developed by heat, ink developed by chemical reaction, ink visible under ultraviolet light, ink visible under infrared light, ink which disturbs the surface of the paper, ink which disturbs ink on the medium, or generally any type of ink or material capable of applying information to the medium. Alternatively or in addition, the handwritten information and/or the typographic information may be applied to the medium using any material or device which disturbs the surface of the paper. For example, the surface of the paper may be disturbed by scratching or cutting the paper, or impressing the paper, such as by creating an impression on carbon or chemical-based duplication paper. Alternatively or in addition, the handwritten information may be applied by a printing device, such as an inkjet printer, a laser printer, or generally any device capable of printing on a document.

FIG. 2B is an illustration 200B of typographic information segregated from an electronic document image of a document containing typographic information and handwritten information. The illustration 200B may include the typographic information 210 separated from the electronic document image 200A of FIG. 2A. The steps of separating typographic information 210 from an electronic document image 200A are discussed in more detail in FIGS. 3-4 below.

FIG. 2C is an illustration of handwritten information segregated from an electronic document image of a document containing typographic information and handwritten information. The illustration 200C may include the handwritten information 200. For example, the handwritten information 220 may have been extracted from the electronic document image 200A of FIG. 2A. The steps of separating handwritten information 220 from an electronic document image 200A are discussed in more detail in FIGS. 3-4 below.

Figure 3:
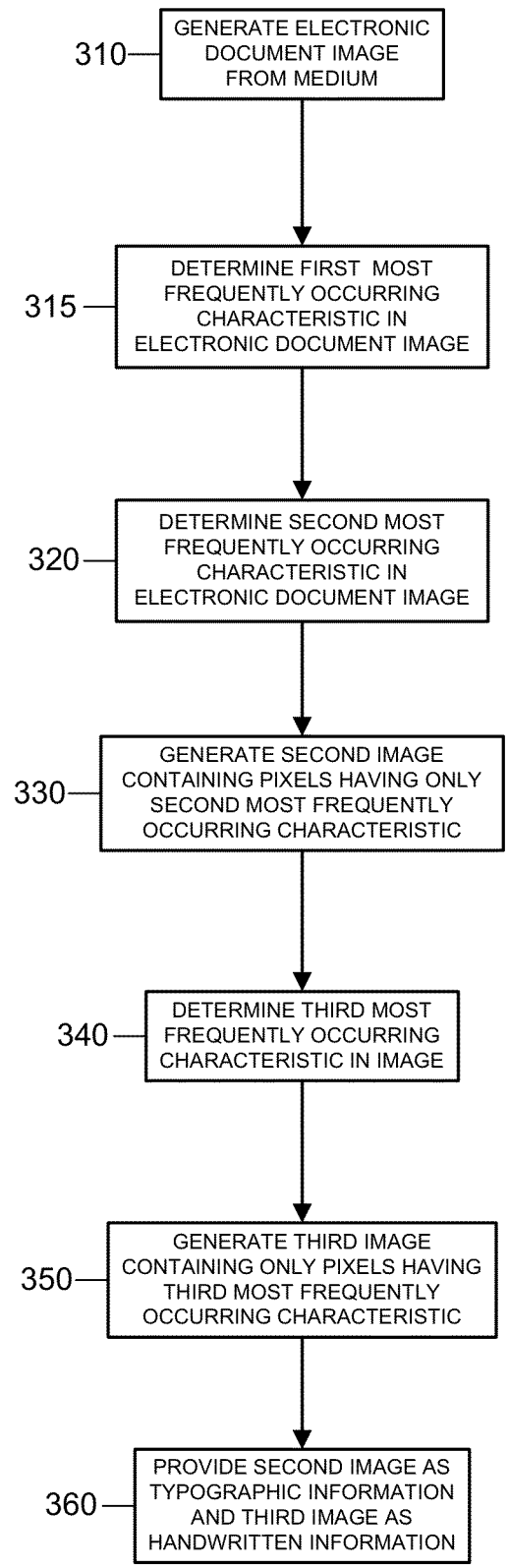
FIG. 3 is a flowchart illustrating the operations of segregating handwritten information from typographic information on a document in the system of FIG. 1, or other systems for segregating handwritten information from typographic information on a document.

FIG. 3 is a flowchart illustrating the operations of segregating handwritten information from typographic information on a document in the system of FIG. 1, or other systems for segregating handwritten information from typographic information on a document. The steps of FIG. 3 are described as being performed by the computing device 120. However, the steps may be performed by the processor of the computing device 120, or by any other hardware component of the computing device 120. Alternatively the steps may be performed by an external hardware component.

At step 310, the system 100 generates an electronic document image of a medium, such as a document. For example, the image acquisition device 150 may acquire an electronic document image of a medium, such as by performing a scan on a document. The document may include information represented by multiple colors, information represented by grayscale or shades of gray, and/or non-visible information, such as information detectable by ultraviolet light, information detectable by infra-red light. Depending on the characteristics of the information on the document, the electronic document image may utilize the RGB color space, the YCbCr color space, the HSV color space, grayscale, black and white, and/or a non-visible color space. Each pixel of the electronic document image may have one or more characteristics which may identify whether the pixel is associated with handwritten information or typographic information. For example, the color, or shade of each pixel may be used to identify the pixel as being associated with handwritten information or typographic information.

Alternatively or in addition, the image acquisition device 150 may associate metadata with each pixel. The metadata may describe characteristics of the information on the document represented by each pixel which may not be identifiable by the pixel alone. For example, the metadata may describe the type of ink used to apply the information represented by the pixel, the quantity of ink used to apply the information represented by the pixel, or generally the metadata may describe any characteristic of the information on the document represented by the pixel which may not be identifiable by the pixel alone. Metadata associated with a pixel may be referred to as characteristics of the pixel.

At step 315, the computing device 120 determines the first most frequently occurring characteristic or combination of characteristics of pixels in the electronic document image. The computing device 120 may identify each characteristic of each pixel, including metadata, and may determine the number of other pixels having each characteristic. For example, the computing device 120 may count the number of pixels having each unique color in the electronic document image and determine the color shared by the most number of pixels. The pixels having the first most frequently occurring characteristic or combination of characteristics may represent the background, or medium of the document. At step 320, the computing device 120 determines the second most frequently occurring characteristic or combination of characteristics of the pixels in the electronic document image. For example, if the second most frequently occurring characteristic or combination of characteristics is a color of the pixels, the computing device 120 may count the number of pixels having each unique color in the electronic document image and determine the color shared by the second most number of pixels. In counting the pixels having each unique color, the computing device 120 may include pixels having a color substantially similar to each unique color. For example, the ink color of handwritten information may vary slightly due to characteristics of the ink or pen, variances in the pressure applied by writer, aging, oxidation or damage to the ink or paper and/or optical aberrations imparted by the process of digitizing the documents. Thus, the pixels may not need to have exactly the same color to be counted, but only a substantially similar color. It will be appreciated that overlapping or non-overlapping characteristic ranges may be defined wherein pixels having a characteristic, e.g. color, falling within a defined range, alone or in combination with a particular value of another characteristic, are considered to be similar, and that such ranges are implementation dependent. The pixels having the second most frequently occurring characteristic or combination of characteristics may represent the typographic information of the document. The steps of determining the second most frequently occurring color are discussed in more detail in FIG. 4 below. At step 330, the computing device 120 generates a second image which contains only the pixels having the second most frequently occurring characteristic or combination of characteristics. For example, if the second most frequently occurring characteristic or combination of characteristics is a color of the pixels, the computing device 120 may apply a filter to the electronic document image such that the only color allowed to pass through the filter is the second most frequently occurring color, or otherwise extract the requisite pixels from digital representation of the document.

At step 340, the computing device 120 determines the third most frequently occurring characteristic or combination of characteristics of the pixels in the electronic document image. For example, if the third most frequently occurring characteristic or combination of characteristics of the pixels is a color, the computing device 120 may count the number of pixels having each unique color in the electronic document image and determine the color shared by the second most number of pixels. The third most frequently occurring characteristic or combination of characteristics may represent the handwritten information. The steps of determining the third most frequently occurring characteristic or combination of characteristics are discussed in more detail in FIG. 4 below. At step 350, the computing device 120 generates a third image which contains only the pixels having the third most frequently occurring characteristic or combination of characteristics. For example, if the third most frequently occurring characteristic or combination of characteristics is a color of the pixels, the computing device 120 may apply a filter to the electronic document image such that the only color allowed to pass through the filter is the third most frequently occurring color, or otherwise extract the requisite pixels from digital representation of the document.

Alternatively or in addition, the pixels of the electronic document image may only contain pixels having two different characteristics, the first most frequently occurring characteristic or combination of characteristics or the second most frequently occurring characteristic or combination of characteristics. In this example, the first most frequently occurring characteristic or combination of characteristics may be the background while the second most frequently occurring characteristic or combination of characteristics may be the handwritten information or the typographic information. The computing device 120 may determine regions around the pixels having the second most frequently occurring characteristic or combination of characteristics as described in FIG. 5 below. The location of the regions within the electronic document image, and the number of the regions, may be used to determine a document type of the document. The document type of the document may be associated with metadata indicating whether the second most frequently occurring characteristic or combination of characteristics is handwritten information or typographic information. For example, if the metadata indicates that the document type should have at least three characteristics, then the computing device 120 may determine that the electronic document image has no handwritten information and the pixels having the second most frequently occurring characteristic or combination of characteristics represent typographic information.

At step 360, the computing device 120 provides the second image as the typographic information of the document and the third image as the handwritten information of the document. The computing device 120 may then perform character or word recognition on the handwritten information to determine the characters represented by the handwritten information. The computing device 120 may also determine a document type corresponding to the typographic information. Based on the document type, and the location of the handwritten information relative to the typographic information, the computing device 120 may determine one or more data fields in the data store 140 corresponding to the handwritten information. The computing device 120 may store the characters represented by the handwritten information in the corresponding data fields of the data store 140.

Alternatively or in addition, the computing device 120 may pre-process the electronic document image, such as after generating the electronic document image at step 310, but before determining the first most frequently occurring characteristic or combination of characteristics at step 315. The computing device 120 may pre-process the electronic document image to extract one or more artifacts or elements from the electronic document image. For example, the computing device 120 may use pattern recognition, or pattern matching, technology to search, or scan, the electronic document image for one or more elements, such as a signature stamp, a logo, or generally any element of the electronic document image which may require pre-processing. The pattern recognition may identify static characteristics associated with an element, such as lines intersecting at certain angles, the occurrence of color in certain quantities or arrangements, or generally any characteristics, or pattern of characteristics, which may be recognizable as an element. For example, the computing device 120 may search the electronic document image to identify any logos which may be present on the electronic document image, such as corporate logos. The computing device 120 may extract the logos from the electronic document image to ensure the logos do not interfere with the processing of the electronic document image. Alternatively or in addition, the computing device 120 may search the document for any pattern or group of pixels which match a known property of a signature stamp, such as a STAMP2000 imprint. For example, the computing device 120 may search for a pattern of pixels which match the header of a signature stamp, a pattern of pixels which have a characteristic of a signature stamp, such as a bar code, or a group of pixels which have a range of color associated with a signature stamp, such as a range of green or a range of yellow associated with a STAMP2000 imprint. Alternatively or in addition, the image acquisition device 150 may include a component which allows the image acquisition device 150 to identify security ink, such as ink used on a STAMP2000 imprint. For example, the image acquisition device 150 may include a STAMP2000 Transfer Agent Document Reader. Alternatively or in addition, once an electronic document image is generated by the image acquisition device 150, the document may be scanned by a STAMP2000 Transfer Agent Document Reader. The STAMP2000 Transfer Agent Document Reader may identify STAMP2000 security ink and may communicate to the computing device 120 an indication that the electronic document image includes security ink and/or may communicate data describing the relative location of the security ink within the electronic document image. Alternatively or in addition, if the document type of the electronic document image has been determined, the document type may be associated with metadata. The metadata may indicate whether the electronic document image is expected to include a signature stamp.

If the computing device 120 identifies that the electronic document image includes a signature stamp, such as through metadata associated with the document type of the electronic document image, a group or pattern of pixels having a characteristic indicative of a signature stamp, or generally any mechanism for identifying a signature stamp, then the computing device 120 may determine a border, or boundary, of the signature stamp. For example, the computing device 120 may process adjacent or surrounding pixels to identify additional pixels having the characteristic indicative of a signature stamp. Alternatively or in addition, the computing device 120 may identify all of the pixels of the signature stamp as the pixels having the fourth most frequently occurring characteristic or combination of characteristics. The computing device 120 may process adjacent or substantially proximal pixels until the computing device 120 encounters pixels no longer having the characteristic indicative of a signature stamp. The computing device 120 may identify the borders of the signature stamp approximately along the first pixels which do not have the characteristic indicative of a signature stamp.

After the computing device 120 determines the borders of the signature stamp, he computing device 120 may remove all of the pixels from the electronic document image which are within the borders of the signature stamp, regardless of whether the pixels have the characteristic indicative of a signature stamp. The computing device 120 may generate an image containing only the pixels within the borders of the signature stamp. The computing device 120 may perform steps 315-360 above on the image of the pixels within the borders of the signature stamp to identify and store handwritten information, such as a signature, and typographic information, such as the signature stamp. In processing the image in accordance with steps 315-360, the computing device 120 may identify the first most frequently occurring characteristic or combination of characteristics of the pixels as representing the typographic information, i.e. the signature stamp, the second most frequently occurring characteristic or combination of characteristics of the pixels as representing the background, and the third most frequently occurring characteristic or combination of characteristics of the pixels as representing the handwritten information, e.g. the signature. Alternatively or in addition, the first, second and third most frequently occurring characteristics or combination of characteristics may represent any of the background, the signature stamp and the handwritten information depending on characteristics of the signature stamp. For example, the computing device 120, through the pattern matching, may identify a type of the signature stamp. The computing device 120 may retrieve data associated with the type of the signature stamp. The retrieved data may be indicative of the characteristics of pixels representing the background, the typographic information stamp, and the handwritten information of the signature stamp.

The computing device 120 may process the typographic information of the signature stamp to determine an identification of a sender associated with the electronic document image. For example, the typographic information may include a bar code indicative of the sender associated with the electronic document image, or a name of the sender associated with the electronic document image. The identification of the sender may be used to determine a type of the document, to facilitate handling the document, or may be stored in the data store 140.

Figure 4:
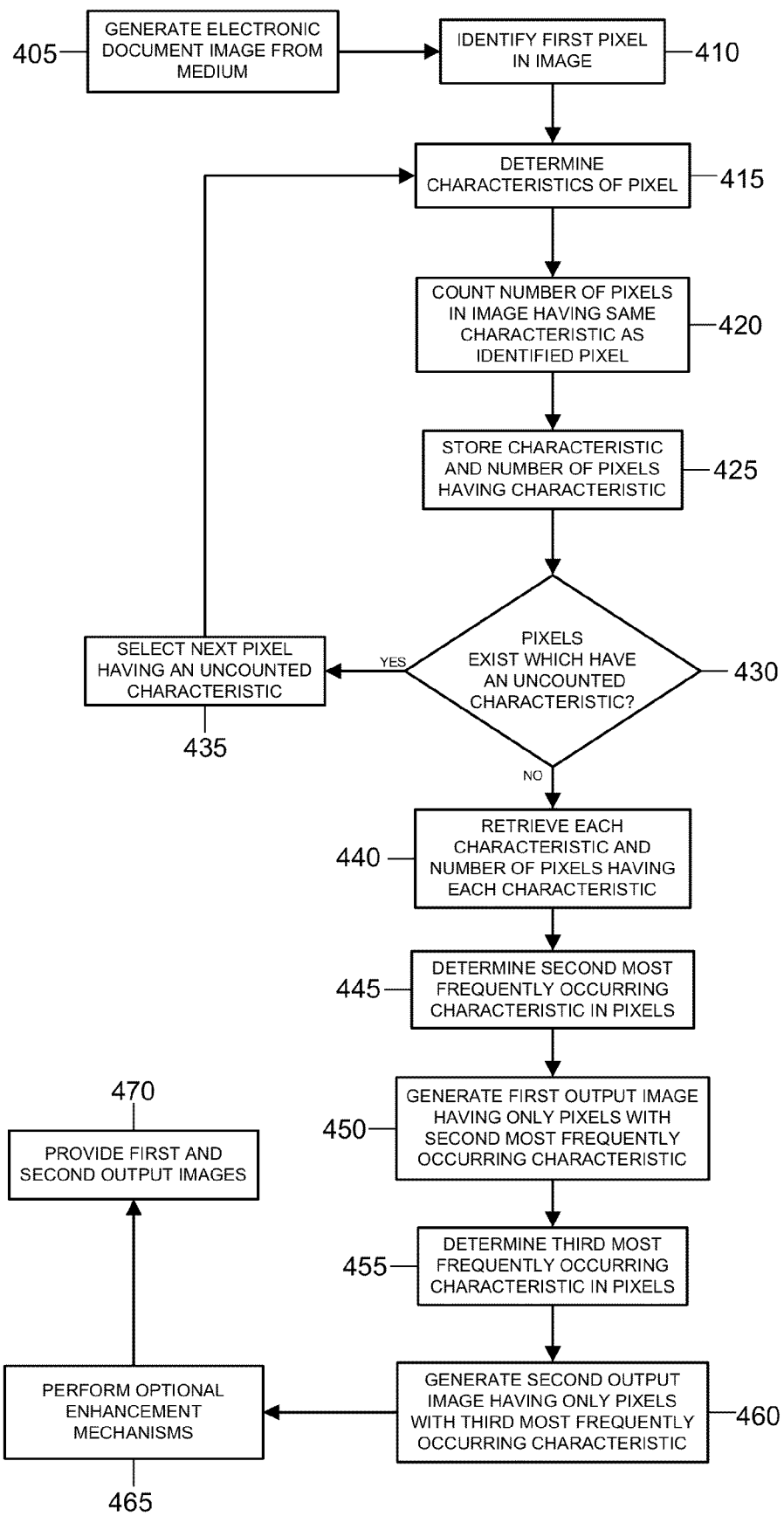
FIG. 4 is a flowchart illustrating the operations of using pixel characteristic frequency to separate handwritten information from typographic information on a document in the system of FIG. 1, or other systems for segregating handwritten information from typographic information on a document.

FIG. 4 is a flowchart illustrating the operations of using pixel characteristic frequency to segregate handwritten information from typographic information in a document in the system of FIG. 1, or other systems for segregating handwritten information from typographic information in a document. The steps of FIG. 4 are described as being performed by the computing device 120. However, the steps may be performed by the processor of the computing device 120, or by any other hardware component of the computing device 120. Alternatively the steps may be performed by an external hardware component.

At step 405, the system 100 generates an electronic document image of a medium, such as a paper document. For example, the image acquisition device 150 may acquire an electronic document image of a medium, such as by performing a scan on a document. As previously discussed, the electronic document image may include one or more pixels which may each have one or more characteristics. At step 410, the computing device 120 identifies the first pixel in the electronic document image. The first pixel may be the pixel in the uppermost left-hand corner of the image. At step 415, the computing device 120 may determine the characteristics of the first pixel. At step 420, for each characteristic of the first pixel, the computing device 120 may count the number of pixels in the electronic document image having the same characteristic as the first pixel. At step 425, the computing device 120 stores an indication of each characteristic of the first pixel and the number of pixels having each characteristic of the first pixel, such as in the data store 140. At step 430, the computing device determines whether additional pixels exist in the electronic document image having a characteristic of which pixels have not yet been counted. If, at step 430, the computing device 120 determines pixels exist which have an uncounted characteristic, the computing device 120 moves to step 435. At step 435, the computing device 120 selects the next pixel in the electronic document image having an uncounted characteristic. The computing device 120 then returns to step 415 and repeats steps 415-425 for the current characteristic.

If, at step 430, the computing device 120 determines there are no remaining pixels in the electronic document image having a characteristic which has not yet been counted, the computing device 120 moves to step 440. At step 440, the computing device 120 retrieves each characteristic and the pixel count for each characteristic, such as from the data store 140. At step 445, the computing device 120 determines the characteristic occurring in the second most pixels. At step 450, the computing device 120 generates a first output image with only pixels having the characteristic occurring in the second most pixels. For example, if the second most frequently occurring characteristic or combination of characteristics is a color of the pixels, the computing device 120 may apply a filter to the electronic document image such that only pixels having the color occurring in the second most pixels is represented in the first output image.

At step 455, the computing device 120 determines the characteristic occurring in the third-most pixels in the electronic document image. At step 460, the computing device 120 generates a second output image having only pixels of the characteristic occurring in the third most pixels. For example, if the third-most frequently occurring characteristic or combination of characteristics is a color of the pixels, the computing device 120 may apply a filter to the electronic document image such that only pixels having the color occurring in the third most pixels is represented in the second output image. At step 465, the computing device 120 may perform one or more optional enhancement mechanisms on the first or second output image. For example, the pixels representing the borders of the electronic document image may have a different color than the pixels representing the remainder of the typographic information. If the pixels representing the borders of the electronic document image have a color similar to that of the pixels in the second output image, the borders of the electronic document image may be included in the second output image. In order to remove the borders from the first or second output image, the computing device 120 may remove any long straight lines from the second output image. A long straight line may be identified by a number of pixels located sequentially, e.g. a pixel vector, within the first or second output image. Alternatively or in addition, a long straight line may be identified by sequential pixels which are parallel, or perpendicular, to an edge of the document.

At step 470, the computing device 120 provides the first output image and the second output image, such as to a user, to a character or word recognition system or to a document recognition system. The first output image may be provided as the typographic information on the document, while the second output image may be provided as the handwritten information on the document. The first output image and the second output image may be provided separately, or segregated from one another. Alternatively or in addition, the first output image may be provided as an overlay to the second output image, or vice-versa. Alternatively or in addition, the first output image and the second output image may be provided as individual layers of a layered document.

Figure 5:
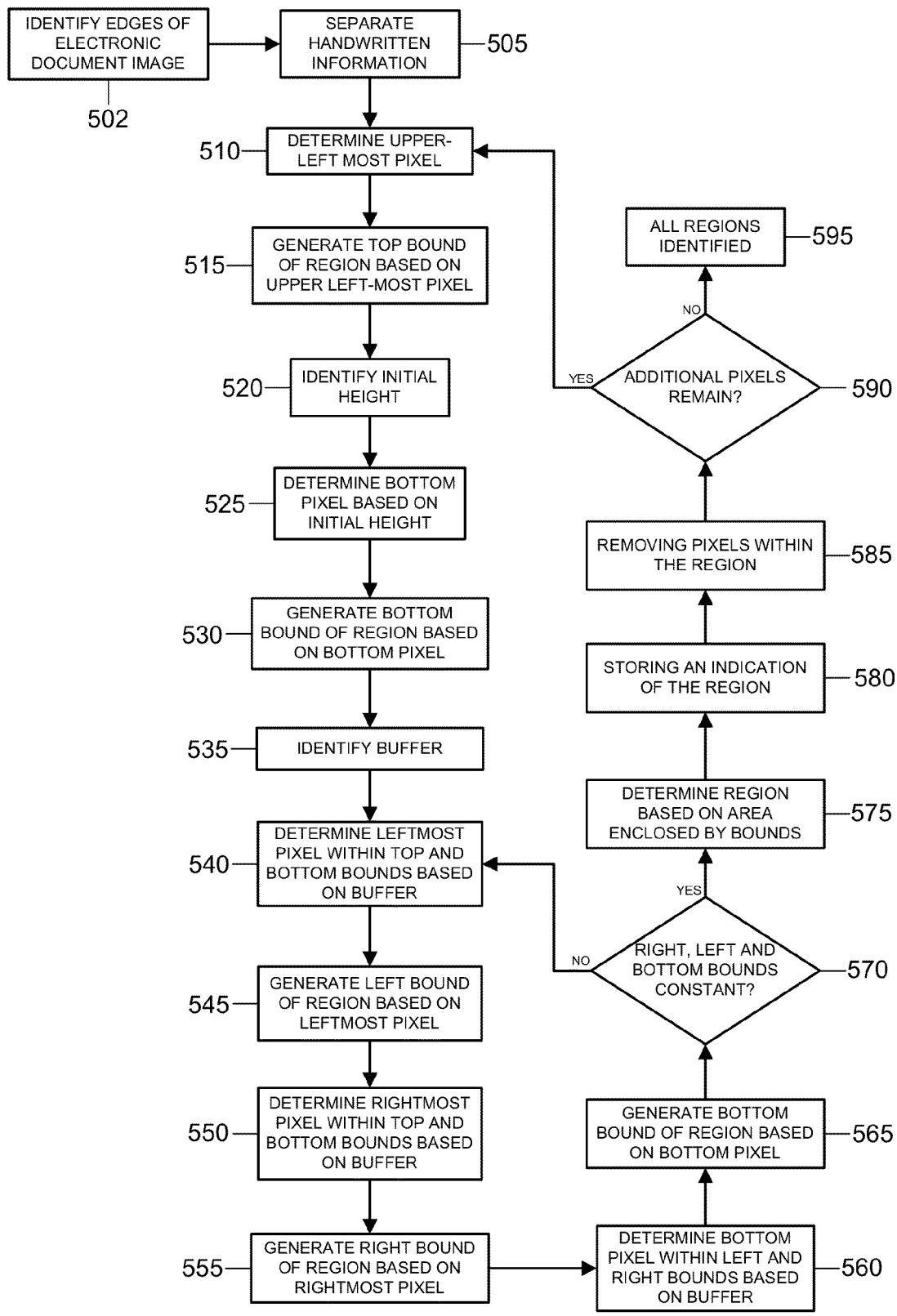
FIG. 5 is a flowchart illustrating the operations of determining regions of an electronic document image containing handwritten information in the system of FIG. 1, or other systems for segregating handwritten information from typographic information on a document.

FIG. 5 is a flowchart illustrating the operations of determining regions of an electronic document image containing handwritten information in the system of FIG. 1, or other systems for segregating handwritten information from typographic information in a document. The pixels representing the handwritten information within each of the determined regions may correspond to a data field associated with each of the determined regions. The steps of FIG. 5 are described as being performed by the computing device 120. However, the steps may be performed by the processor of the computing device 120, or by any other hardware component of the computing device 120. Alternatively the steps may be performed by an external hardware component.

At step 502, the computing device 120 identifies an electronic document image of a document containing handwritten information and typographic information. The computing device 120 determines a top, bottom, left, and right side of the electronic document image based on the orientation of the typographic information. For example, in order to determine the orientation of the typographic information, the computing device 120 may separate the typographic information from the electronic document image and may perform optical character recognition on the typographic information. The computing device 120 may then determine whether the characters recognized form known words. The computing device 120 may rotate the typographic information and perform optical character recognition until the computing device 120 is able to recognize characters which form known words. Alternatively or in addition, if the document type of the typographic information is known, the computing device 120 may determine the orientation of the typographic information by comparing a template of the document type to the typographic information. Once the computing device 120 determines an orientation of the typographic information, the computing device 120 may identify the top, bottom, left and right of the electronic document image based on the orientation of the typographic information. Alternatively or in addition, the computing device 120 may detect horizontal and/or vertical lines in order to orient the document.

At step 505, the computing device 120 separates the handwritten information from typographic information in the electronic document having the edges identified in step 502. The steps of separating the handwritten information from the typographic information of the electronic document image are discussed in more detail in FIGS. 3-4 above. At step 510, the computing device 120 identifies the upper left most pixel of the handwritten information. The upper-left most pixel may be the colored pixel closest to the top edge and the left edge of the electronic document image.

At step 515, the computing device 120 generates a top bound of a region of the electronic document image containing handwritten information. The top bound is based on a line running through the upper-left most pixel which is parallel to the top edge and the bottom edge of the electronic document image. At step 520, the computing device 120 identifies the initial height to be used in the algorithm. The initial height may be a number of pixels. For example, the initial height may be identified by the operator by using the interfaces discussed in FIGS. 6A-B below.

At step 525, the computing device 120 determines an initial bottom pixel based on the initial height. For example, the initial bottom pixel may be any pixel of the handwritten information which is the number of pixels of the height below the upper-left most pixel. At step 530, the computing device 120 generates the bottom bound of the region of the electronic document image containing handwritten information. The bottom bound is based on a line running through the bottom pixel which is parallel to the top edge and the bottom edge of the electronic document image. At step 535, the computing device 120 identifies the buffer, or sway, to be used in the algorithm. For example, the buffer may be identified by the operator by using the interfaces discussed in FIGS. 6A-B below. The buffer may indicate a threshold for determining whether additional pixels exist for the region.

At step 540, the computing device 120 determines the leftmost pixel of the handwritten information which is located within the top bound and bottom bounds. The leftmost pixel of the handwritten information may be the colored pixel, or pixel otherwise having the requisite characteristic(s), closest to the left edge of the electronic document image which is located within the top bound and the bottom bound and has no other colored pixels within the buffer number of pixels to the left of it. If the leftmost pixel reaches the left edge, then the leftmost pixel may be located at the left edge. At step 545, the computing device 120 generates a left bound of the region of the electronic document image containing handwritten information. The left bound is based on a line running through the leftmost pixel which is parallel to the left and right edges of the electronic document image.

At step 550, the computing device 120 determines the rightmost pixel of the handwritten information which is located within the top bound and bottom bounds. The rightmost colored pixel may be the colored pixel closest to the right edge of the electronic document image which is located within the top bound and the bottom bounds and has no other colored pixels within the buffer number of pixels to the right of it. If the rightmost pixel reaches the right edge, then the rightmost pixel may be located at the right edge. At step 555, the computing device 120 generates a right bound of the region of the electronic document image containing handwritten information. The right bound is based on a line running through the rightmost pixel which is parallel to the left and right edges of the electronic document image.

At step 560, the computing device 120 determines a bottom pixel of the handwritten information which is located within the left and right bounds. The bottom pixel of the handwritten information may be the colored pixel closest to the bottom edge of the electronic document image which is located within the left and right bounds and has no other colored pixels within the buffer number of pixels below it. If the bottom pixel reaches the bottom edge, then the bottom pixel may be located at the bottom edge. At step 565, the computing device 120 generates a bottom bound of the region of the electronic document image containing handwritten information. The bottom bound is based on a line running through the bottom pixel which is parallel to the top and bottom edges of the electronic document image.

At step 570, the computing device 120 determines whether the right, left and bottom bounds have all remained constant since the previous loop through steps 540-565. If the right, left and bottom bounds have changed since the pervious loop through steps 540-565, then the bounds have not yet been determined and the computing device 120 returns to step 540 and repeats step 540-565. If the right, left, and bottom bounds remain the same for multiple loops, then the bounds of the region have been determined and the computing device 120 moves to step 575.

At step 575, the computing device 120 determines the region of the electronic document image enclosed by the determined bounds. At step 580, the computing device 120 stores an indication, or a description of the location of the region within the electronic document image in the data store 140. The location of the region may be used to identify a data field associated with the handwritten information located within the region. Alternatively or in addition, the computing device 120 may derive information, such as characters, words or a set of words, from the handwritten information located within the given region. For example, the computing device 120 may perform OCR or IWR on the plurality of pixels representing the handwritten information within the region. The derived information may be stored in the identified data field associated with the region. At step 585, the computing device 120 removes the pixels within the region from the handwritten information, such that the pixels within the region are not processed multiple times. At step 590, the computing device 120 determines whether any additional pixels remain in the handwritten information. If, at step 590, the computing device 120 determines that additional pixels remain in the user contributed data, then the computing device 120 returns to step 510 to determine additional regions of the electronic document image. If, at step 590, the computing device 120 determines there are no additional pixels remaining, the computing device 120 moves to step 595. At step 595, the computing device 120 determines that all of the regions have been identified.

Alternatively or in addition, upon determining the regions of the electronic document image containing handwritten information, the computing device 120 may determine the height of the determined regions. The height may be used to determine whether the computing device 120 determined that two lines of separate handwritten information were part of the same region. For example, if a user applies two lines of handwritten information to a document with a minimal amount of vertical space between them, the computing device 120 may determine that both lines are the same region. In order to modify any regions which contain more than one line of handwritten information, the computing device 120 may analyze the height of each of the determined regions. The heights of the determined regions are expected to be substantially similar; however, if multiple lines were grouped into one region, such a region may have a height which is a multiple of the substantially similar heights of at least some of the other regions. Thus, the computing device 120 may determine a common minimal height of the regions having a substantially minimal height as the common base height of the regions. The common base height may be an average, mean, norm, or range of the heights of the regions having the substantially minimal height. For any regions which have a height which is a multiple of the common base height, the computing device 120 may split the regions into sub-regions having an equal height which is substantially equivalent to the common base height. For example, if the common base height is 10 pixels and a region has a height of 30, the computing device 120 may split the region into three sub-regions having a height substantially equivalent to the common base height of 10 pixels. The computing device 120 may account for overlap between the regions, by adding overlap pixels to each region. Thus, the first sub-region may include pixel rows 1-13, the second sub-region may include pixel rows 7-23 and the third sub-region may include pixel rows 17-30. Each sub region may be identified as a separate region.

Figure 6A:
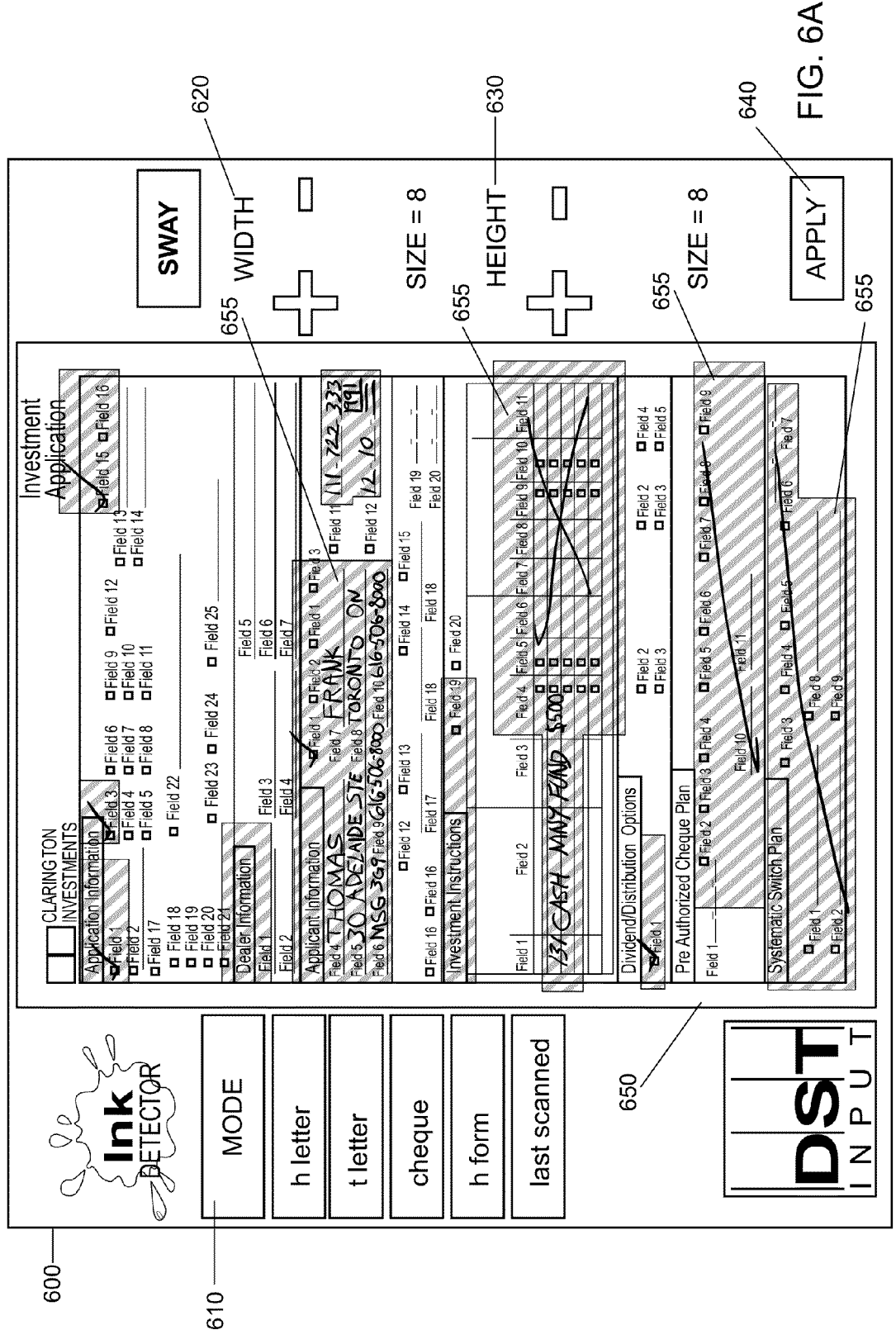
FIG. 6A is a screenshot of an interface illustrating regions of an electronic document image containing handwritten information in the system of FIG. 1, or other systems for segregating handwritten information from typographic information on a document.

FIG. 6A is a screenshot of an interface 600A showing regions of an electronic document image containing handwritten information in the system of FIG. 1, or other systems for segregating handwritten information from typographic information in a document. The interface 600A includes a mode selector 610, a sway width selector 620, a sway height selector 630, an apply button 640, and an electronic document image 650. The image 650 includes identified regions 655. The regions 655 represent areas of the electronic document image 650 containing handwritten information. The mode selector 610 allows an operator to select one or more modes for viewing the electronic document image 650, or for loading or identifying a type of the electronic document image 650, such as h letter for handwritten letter, t letter for typed letter, cheque for a bank cheque/check, h form for a form with handwriting, or last scanned for whatever was previously read from the image acquisition device 150. Each of the modes may be associated with sway width and height values for the document type associated with the mode. The sway width and height may vary from mode to mode, for example, typed information may be closer together than handwritten information and therefore may have lower sway values. The sway width selector 620 allows the operator to select the vertical spacing of pixels to use in identifying the regions 655. In the interface 600A, the operator used the width selector 620 to select a width value of 8. The height selector 630 allows an operator to select the horizontal spacing of pixels to use in identifying the regions 655. In the interface 600A, the operator used the height selector 630 to select a height value of 8. The apply button 640 may be used to apply selections made with the width selector 620 and the height selector 630.

Figure 6B:
FIG. 6B is a screenshot of an interface showing alternative sized regions of an electronic document image containing handwritten information in the system of FIG. 1, or other systems for segregating handwritten information from typographic information on a document.

FIG. 6B is a screenshot of an interface 600B showing alternative sized regions of an electronic document image containing handwritten information in the system of FIG. 1, or other systems for separating handwritten information from typographic information in a document. The interface 600B includes a mode selector 610, a sway width selector 620, a sway height selector 630, an apply button 640, and an electronic document image 650. The electronic document image 650 includes identified regions 655. The regions 655 represent areas containing handwritten data. The mode selector 610 allows an operator to select one or more modes for viewing the electronic document image 650, or for loading or identifying a type of the electronic document image 650, such as h letter for handwritten letter, t letter for typed letter, cheque for a bank cheque/check, h form for a form with handwriting, or last scanned for whatever was previously read from the image acquisition device 150. Each of the modes may be associated with sway width and height values for the document type associated with the mode. The sway width and height may vary from mode to mode, for example, typed information may be closer together than handwritten information and therefore may have lower sway values. The sway width selector 620 allows the operator to select the vertical spacing of pixels to use in identifying the regions 655. In the interface 600B, the operator used the width selector 620 to select a width value of 2. The height selector 630 allows an operator to select the horizontal spacing of pixels to use in identifying the regions 655. In the interface 600B, the operator used the height selector 630 to select a height value of 2. The apply button 640 may be used to apply selections made with the width selector 620 and the height selector 630. Since the width and height value in the FIG. 6B are 2, the regions 655 in the FIG. 6B are more closely bounding the handwritten data than the regions 655 in the FIG. 6A.

FIG. 7 illustrates a general computer system 700, which may represent the computing device 120, or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, the service provider server 240 may communicate with users 120A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of segregating handwritten information from typographic information on a document, the method comprising:

receiving an electronic document image of a document, the electronic document image comprising a plurality of pixels, wherein each of the plurality of pixels comprises a characteristic of a plurality of characteristics;

identifying a first, a second and a third most frequently occurring characteristic of the plurality of pixels, wherein the pixels of the plurality of pixels comprising the first most frequently occurring characteristic of the plurality of characteristics represent a background of the document;

determining typographic information of the document, wherein the typographic information is represented by the pixels of the plurality of pixels of the electronic document image which comprise the second most frequently occurring characteristic of the plurality of characteristics;

determining, by a processor, handwritten information of the document, wherein the handwritten information is represented by the pixels of the plurality of pixels of the electronic document image which comprise the third most frequently occurring characteristic of the plurality of characteristics; and deriving a first representation of the handwritten information and a second representation of the typographic information.

2. The method of claim 1 wherein the characteristic of each of the plurality of pixels is characterized by a color of a plurality of colors, or a range of colors of the plurality of colors.

3. The method of claim 1 further comprising filtering out pixels of the plurality of pixels from the electronic document image if the color of the pixels of the plurality of pixels substantially comprises a shade of black or a shade of grey.

4. The method of claim 3 wherein a degree of the shade of black or the shade of grey is based on a shade of the second most frequently occurring color of the plurality of colors, or a shade of the third most frequently occurring color of the plurality of colors.

5. The method of claim 1 further comprising:
determining a plurality of characters corresponding to the handwritten information;
determining a document type corresponding to the typographic information; and
providing the plurality of characters and an indication of the document type.

6. The method of claim 5 further comprising determining a location of the handwritten information on the document relative to the typographic information.

7. The method of claim 6 further comprising determining a data field corresponding to the handwritten information based on the location of the handwritten information on the document relative to the typographic information, and the document type corresponding to the typographic information.

8. The method of claim 7 further comprising storing the plurality of characters in a database record corresponding to the data field.

9. The method of claim 6 wherein determining the document type corresponding to the typographic information further comprises determining the document type corresponding to the typographic information based in part on the location of the handwritten information on the document relative to the typographic information.

10. The method of claim 6 further comprising:
determining an expected location of the handwritten information on the document relative to the typographic information; and
storing an indication of whether the location of the handwritten information on the document relative to the typographic information coincides with the expected location of the handwritten information on the document relative to the typographic information.

11. The method of claim 5 wherein determining the plurality of characters corresponding to the handwritten information further comprises determining the plurality of characters corresponding to the handwritten information based in part on the document type corresponding to the typographic information.

12. The method of claim 5 further comprising:
determining a region of the document where the handwritten information is located;
determining a portion of the typographic information corresponding to the region of the document;
identifying a data field associated with the portion of the typographic information based on the document type corresponding to the typographic information; and
storing the plurality of characters corresponding to the handwritten information located in the region in a record of a database corresponding to the data field.

13. The method of claim 12 wherein determining the region of the document corresponding to the handwritten information further comprises:
(a) determining a top edge, a bottom edge, a right edge and a left edge of the document, wherein the edges are determined based on an orientation of the typographic information relative to the document;
(b) identifying an upper-left most pixel of the plurality of pixels of the handwritten information, wherein the upper-left most pixel comprises a pixel located closest to the top edge of the document and closest to the left edge of the document;
(c) determining a top bound of the region of the document based on a top line running through the upper-left most pixel, wherein the top line is parallel to the top edge of the document and the bottom edge of the document;
(d) determining a bottom pixel of the plurality of pixels of the handwritten information wherein the bottom pixel is located a height number of pixels below the upper-left most pixel;
(e) determining a bottom bound of the region of the document based on a bottom line running through the bottom pixel, wherein the bottom line is parallel to the top edge of the document and the bottom edge of the document;
(f) determining a leftmost pixel of the plurality of pixels of the handwritten information located within the top bound and the bottom bound, wherein the leftmost pixel is located at the left edge of the document, or the leftmost pixel comprises a closet pixel to the left edge of the document which is located within the top bound and the bottom bound and has no other pixels within a buffer number of pixels to the left;
(g) determining a left bound of the region of the document based on a left line running through the leftmost pixel, wherein the left line is parallel to the left edge of the document and the right edge of the document;
(h) determining a rightmost pixel of the plurality of pixels of the handwritten information located within the top bound and the bottom bound, wherein the rightmost pixel is located at the right edge of the document or the rightmost pixel comprises a closest pixel to the right edge of the document which is located within the top bound and the bottom bound and has no other pixels with the buffer number of pixels to the right;
(i) determining a right bound of the region of the document based on a right line running through the rightmost pixel, wherein the right line is parallel to the left edge of the document and the right edge of the document;

(j) determining the bottom pixel of the plurality of pixels of the handwritten information which is located within the left bound and the right bound, wherein the bottom pixel is located at the bottom edge of the document or the bottom pixel is a closest pixel to the bottom edge of the document with no other pixels within the buffer number of pixels below;

(k) determining the bottom bound of the region of the document based on a bottom line running through the bottom pixel, wherein the bottom line is parallel to the top edge of the document and the bottom edge of the document;

(l) repeating steps (d)-(k) using the bottom bound determined in step (k), the left bound determined in step (g), and the right bound determined in step (i) until the bottom bound, left bound and right bound remain constant; and (m) determining the region of the document based on an area enclosed by the top bound, the bottom bound, the left bound and the right bound.

14. The method of claim 13 further comprising:
(n) storing an indication of the region and the plurality of characters corresponding to the handwritten information located within the region.

15. The method of claim 14 further comprising:
(o) removing the pixels corresponding to the handwritten information located within the region; and
(p) repeating steps (b)-(o) until all of the plurality of pixels of the handwritten information have been removed from the electronic document image.

16. A method of segregating handwritten information from typographic information on a document, the method comprising:
receiving an electronic document image of a document, the electronic document image comprising a plurality of pixels, wherein each of the plurality of pixels comprises a characteristic of a plurality of characteristics;
determining a document type of the electronic document image, wherein the document type is indicative of a first characteristic of the plurality of pixels associated with typographic information and a second characteristic of the plurality of pixels associated with handwritten information;
determining typographic information of the document, wherein the typographic information is represented by the pixels of the plurality of pixels of the electronic document image which comprise the first characteristic;
determining, by a processor, handwritten information of the document, wherein the handwritten information is represented by the pixels of the plurality of pixels of the electronic document image which comprise the second characteristic; and
deriving, based on frequency of occurrence, a representation of the handwritten information and the typographic information.

17. A method of separating a first information applied to a medium at a first date/time from a second information applied to the medium at a second date/time, the method comprising:
receiving an electronic image of a medium, the medium comprising a first information applied at a first date/time and a second information applied at a second date/time, wherein the electronic image comprises a plurality of pixels and each pixel of the plurality of pixels comprises a characteristic of a plurality of characteristics;
determining the first information applied to the medium, wherein the first information applied to the medium comprises the pixels of the plurality of pixels of the electronic image which comprise a second most frequently occurring characteristic of the plurality of characteristics;
determining, by a processor, the second information applied to the medium, wherein the second information applied to the medium comprises pixels of the plurality of pixels of the electronic image which comprise a third most frequently occurring characteristic of the plurality of characteristics; and
deriving a first representation of the first information and a second representation of the second information.

18. The method of claim 17 further comprising:
determining a document type corresponding to the first information applied to the medium and a plurality of characters corresponding to the second information applied to the medium; and
providing the document type and the plurality of characters.

19. The method of claim 17 wherein the medium comprises a paper medium.

20. A system for segregating handwritten information from typographic information on a document, the system comprising:
a memory operative to store an electronic document image of a document, the electronic document image comprising a plurality of pixels, wherein each of the plurality of pixels comprises a characteristic of a plurality of characteristics;
an interface coupled with the memory and operative to receive the electronic document image; and
a processor coupled with the interface and operative to receive, via the interface, the electronic document image of the document, identify a first, a second, and a third most frequently occurring characteristic of the plurality of pixels, wherein the pixels of the plurality of pixels comprising the first most frequently occurring characteristic of the plurality of characteristics represent a background of the document, determine typographic information of the document, wherein the typographic information is represented by the pixels of the plurality of pixels of the electronic document image which comprise the second most frequently occurring characteristic of the plurality of characteristics, determine handwritten information of the document, wherein the handwritten information is represented by the pixels of the plurality of pixels of the electronic document image which comprise the third most frequently occurring characteristic of the plurality of characteristics, and derive a first representation of the handwritten information and a second representation of the typographic information.

21. The system of claim 20 further comprising:
the processor further operative to determine a plurality of characters corresponding to the handwritten information, determine a document type corresponding to the typographic information, and provide, via the interface, the plurality of characters and an indication of the document type.

22. The system of claim 21 further comprising:
the processor further operative to determine a location of the handwritten information on the document relative to the typographic information.

23. The system of claim 22 further comprising:
the processor further operative to determine a data field corresponding to the handwritten information based on the location of the handwritten information on the document relative to the typographic information, and based on the document type corresponding to the typographic information.

24. The system of claim 23 further comprising:
the processor further operative to store the plurality of characters in a database record corresponding to the data field.

25. The system of claim 22 further comprising:
the processor further operative to determine the document type corresponding to the typographic information based in part on the location of the handwritten information on the document relative to the typographic information.

26. The system of claim 22 further comprising:
the processor further operative to determine an expected location of the handwritten information within the electronic document image relative to the typographic information, and store an indication of whether the location of the handwritten information within the electronic document relative to the typographic information coincides with the expected location of the handwritten information within the electronic document image relative to the typographic information.

27. The system of claim 21 further comprising:
the processor further operative to determine the plurality of characters corresponding to the handwritten information based in part on the document type corresponding to the typographic information.

28. The system of claim 21 further comprising:
the processor further operative to determine a region of the document where the handwritten information is located, determine a portion of the typographic information corresponding to the region of the document, identify a data field associated with the portion of the typographic information based on the document type corresponding to the typographic information, and store the plurality of characters corresponding to the handwritten information located in the region in a record of the memory corresponding to the data field.

29. The system of claim 20 wherein the characteristic of each of the plurality of pixels substantially comprises a color of a plurality of colors.

30. The system of claim 29 further comprising:
the processor further operative to filter out pixels of the plurality of pixels from the electronic document image if the color of the pixels of the plurality of pixels comprises a shade of black or a shade of grey.

31. The system of claim 30 wherein a degree of the shade of black or the shade of grey is based on a shade of the second most frequently occurring color of the plurality of colors or a shade of the third most frequently occurring color of the plurality of colors.

* * * * *